(12) United States Patent
Schmierer et al.

(10) Patent No.: US 7,240,935 B2
(45) Date of Patent: Jul. 10, 2007

(54) SUCTION GRIP ARM

(75) Inventors: Gernot Schmierer, Herrenberg (DE);
Kurt Schmalz, Dornstetten (DE);
Stanislav Gorb, Leonberg (DE);
Eduard Arzt, Ditzingen (DE)

(73) Assignee: J. Schmalz GmbH, Glatten (DE)

( * ) Notice: Subject to any disclaimer, the term of this patent is extended or adjusted under 35 U.S.C. 154(b) by 132 days.

(21) Appl. No.: 10/767,641

(22) Filed: Jan. 29, 2004

(65) Prior Publication Data
US 2004/0207219 A1 Oct. 21, 2004

(30) Foreign Application Priority Data
Jan. 29, 2003 (DE) ................. 103 04 169

(51) Int. Cl.
*A47J 45/00* (2006.01)
(52) U.S. Cl. .................................... 294/64.1
(58) Field of Classification Search .............. 294/64.1, 294/64.2, 64.3; 901/40; 414/752.1
See application file for complete search history.

(56) References Cited

U.S. PATENT DOCUMENTS

| 2,853,333 | A | * | 9/1958 | Littell ..................... 294/64.1 |
| 3,005,652 | A | * | 10/1961 | Helm ...................... 294/64.1 |
| 3,152,828 | A | * | 10/1964 | Lytle ...................... 294/64.1 |
| 3,240,525 | A | * | 3/1966 | Wood ...................... 294/64.1 |
| 3,326,593 | A | * | 6/1967 | Farmer et al. ............ 294/64.1 |
| 3,330,589 | A | * | 7/1967 | Mumma ................... 294/64.1 |
| 3,556,579 | A | * | 1/1971 | Seymour-Walker et al. .. 294/65 |
| 3,926,466 | A | * | 12/1975 | Carpenter ................ 294/64.1 |
| 4,582,353 | A | * | 4/1986 | Alvernhe ................. 294/64.1 |
| 4,635,988 | A | * | 1/1987 | Potters et al. ............ 294/64.1 |
| 5,611,585 | A | * | 3/1997 | Lingen .................... 294/64.1 |
| 5,799,661 | A | * | 9/1998 | Boyd et al. ............... 128/898 |
| 6,203,083 | B1 | * | 3/2001 | Reimann .................. 294/64.1 |
| 6,382,692 | B1 | * | 5/2002 | Schmalz et al. .......... 294/64.1 |

FOREIGN PATENT DOCUMENTS

DE 41 29 289 3/1992
DE 299 05 951 7/1999

* cited by examiner

*Primary Examiner*—Eileen D. Lillis
*Assistant Examiner*—Esther Onyinyechi Okezie
(74) *Attorney, Agent, or Firm*—Young Basile Hanlon Mac Farlane & Helmholdt

(57) ABSTRACT

A vacuum gripper for suctioning work pieces, having a vacuum connection, a flexible suction body and a suction body holder, where the side of the suction body facing the work piece has a sealing lip bounding a vacuum chamber, and the vacuum chamber is connected to the vacuum connection. The suction body has a contact surface abutting the work pieces with prevailing vacuum in the vacuum chamber. The contact surface is provided with elements, where the elements are have a rod or pin-shaped configuration and form a microstructure.

22 Claims, 2 Drawing Sheets

SUCTION GRIP ARM

The invention relates to a suction grip arm for suctioning work pieces, comprising a vacuum connection, a flexible suction body and a suction body holder, where the side of the suction body facing the work piece has a sealing lip bounding a vacuum chamber and the vacuum chamber is connected by air flow to the vacuum connection, where the contact surface of the suction body abuts the work piece with a prevailing vacuum in the vacuum chamber.

Vacuum grippers are used to suction objects or work pieces so that they can either be held in position or manipulated. If the vacuum grippers are located on manipulators, the suctioned object can be transported. In each case, the appropriate vacuum grippers are required for different objects. Usually, the vacuum grippers are matched to the size and weight of the object to be manipulated. The vacuum grippers have a peripheral sealing lip by means of which a vacuum chamber is closed or sealed with respect to the environment. This allows flat objects, for example metal sheets or plates of glass, to be picked up and transported relatively easily. However, with metal sheets the problem arises that the sheets slip on the vacuum gripper since the surface of the metal is oily. In some instances, this can lead to production delays and, in the worst case, to production stoppages.

As part of ever increasing production speeds, it must be ensured that the objects, or work pieces, are picked up and held securely, even if relatively high forces are introduced through the vacuum gripper to the object to be transported. Usually, these are vertical forces when the object is lifted and tangential forces resulting from acceleration and deceleration. These tangential forces are usually transmitted through friction by the vacuum gripper to the object, or conversely. Greater security against objects becoming detached can be achieved by increasing the vacuum, but then there is the risk that the objects, in particular thin metal sheets or similar, will be deformed. Deformation of this type is unacceptable in thin metal sheets with a thickness of less than one millimeter, which are used primarily to build automobile bodies.

In DE 299 05 951 U1 a suction gripper is proposed whose suction chamber is furnished with ribs projecting into the suction chamber, where the ribs have channels to pick up and channel away oil. With a vacuum gripper of this type, a work piece is suctioned, then the work piece is supported against the ribs and the frictional resistance between the suction gripper and the work piece is increased. The open faces of the ribs which have the oil channels provide support.

The object of the invention is to provide a vacuum gripper with which even higher tangential forces can be transmitted to the work piece at the same vacuum.

This object is achieved with a suction gripper of the aforementioned type in accordance with the invention in which the contact surface has a microstructure formed from rod-shaped, louver-shaped or pin-shaped elements.

The advantage of configuring the elements as rods or pins is that they are relatively flexible and can bend easily. When the suction body is drawn against the work piece by the application of vacuum, the rod-shaped or pin-shaped elements contact the surface of the work piece like hairs on a brush, not touching it with their end faces but with part of their lateral surfaces. This creates a substantially larger contact surface than if they contacted the work piece solely with their end faces. Because of the plurality of elements, they form a microstructure at the contact surface.

The plurality of elements creates a relatively large contact surface over which a correspondingly large frictional or shear force can be transmitted from the vacuum gripper to the work piece. This has the specific advantage that shear force can be transmitted, even with wet surfaces, since the individual elements do not float on the film of moisture but penetrate through it to the surface of the work piece. There is sufficient space between the individual elements to pick up the fluid. In this way, cycle times for industrial robots can be reduced since greater shear forces resulting from greater acceleration and deceleration events can be transmitted safely without the need to increase the vacuum. The best results are obtained when work pieces with smooth surfaces, such as glass, metal, plastic or painted, wet or oily surfaces are suctioned.

Advantageous improvements and embodiments can be found in the dependent claims. Specifically, the elements form one part of a microstructure which covers one part or the entire contact surface.

The elements, or at least their free ends, are configured to be pliably flexible. This allows the elements to bend easily so that they can lie against the object, or work piece, to be suctioned with their lateral surfaces.

The elements can be made of the same material as the vacuum gripper, in particular of plastic. The elements are advantageously disposed as one piece on the suction body. This one-piece configuration of suction body and elements has the considerable advantage that relatively high forces can be transmitted without the elements separating from the suction body.

In another embodiment, provision is made for the elements to be disposed on a carrier to be attached to the vacuum gripper. This has the advantage that worn elements can be replaced by removing the carrier and using a new carrier. The carrier is configured as a plate or film. Several layers of film can be advantageously disposed one above the other and used like tear-off sheets.

It has been shown that high shear forces can be transmitted if the length of the elements is two to twenty times, specifically five to ten times greater than their thickness or diameter. In addition, optimal packing density is achieved if the elements are spaced at a distance from each other which is 0.5 to 2.5, specifically 1 to 2 times their thickness. With this packing density, the elements provide reciprocal support so that they abut the work piece with their lateral surfaces, but are not bent over completely.

Embodiments of the elements provide for the elements to have a rounded, flattened or pointed free end. Depending on the application, one or the other version is preferred. The elements can have a circular, elliptical or flat, that is to say planar, cross-section or a leaf shape. With a symmetrical cross-section, the orientation of the arrangement of elements on the contact surface is unimportant, whereas optimal results are obtained with elements having an asymmetrical cross-section if the plane of the leaf extends in the circumferential direction, or perpendicular to the primary direction in which the shear forces act. Then these elements lie with their flat side against the object to be suctioned and they comprise a relatively large contact area.

The elements advantageously project perpendicular to the contact surface. With shear forces which emanate principally from one direction, these elements can also be disposed at an angle opposite to the direction of force, so that they are already inclined in their preferred direction when the vacuum gripper is applied.

The sealing lip is advantageously free of elements so that it can conform to the surface of the object to be suctioned in a fluid-tight manner.

In a preferred vacuum gripper, the elements extend over 70 to 95% of its radius, starting from the center. One or several sealing lips are located in the area that is free of elements.

The length of the elements advantageously measures 0.1 to 3 mm, specifically 0.5 to 1 mm.

The invention also relates to a method for manufacturing a vacuum gripper which is injection molded. The suction body and the elements can be made of one material or of two different materials. The elements can be furnished on a film onto which the suction body is molded.

Another method provides for the elements to be cut out, at least in part, from the contact surface of the vacuum body using a laser.

Additional advantages, features and details of the invention can be found in the description to follow in which different embodiments of the invention are described with reference to the drawing. The features depicted in the drawing and recited in the description and in the claims can be essential to the invention either individually or collectively in any combination.

Figure 1:
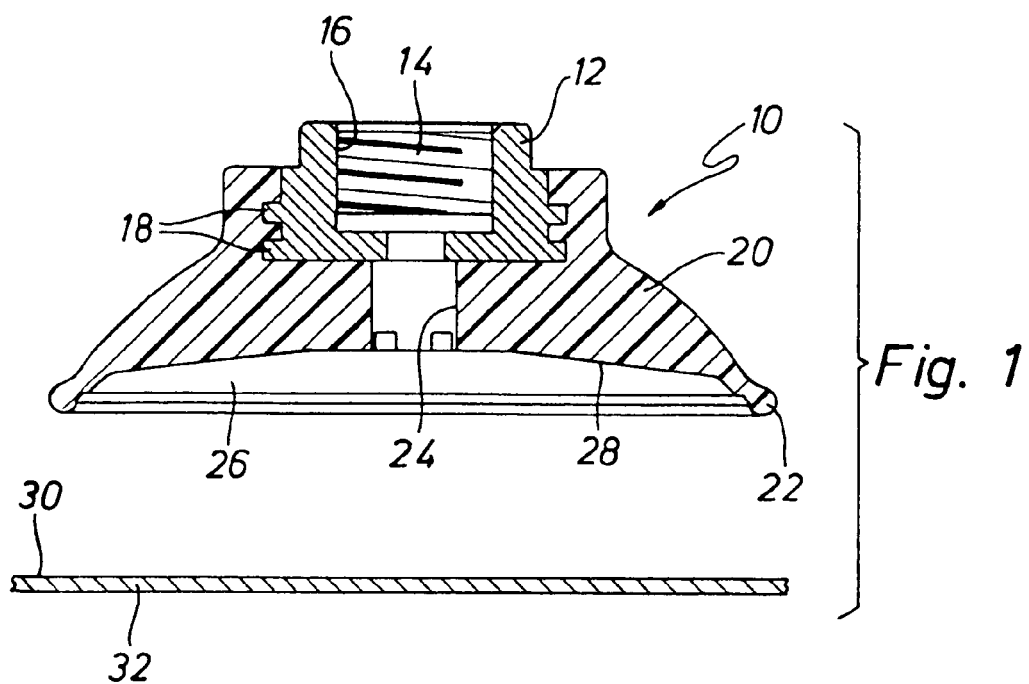
FIG. 1 shows a cross-section through a vacuum gripper.

In FIG. 1, which shows a cross-section through a vacuum gripper identified overall as 10, a suction body holder is identified with the reference numeral 12. It has a vacuum connection 14 which is furnished, for example, with an internal thread 16. The outside of the suction body holder is furnished with two annular collars 18 to which a flexible suction body 20 is securely attached. This suction body 20 is approximately bell-shaped and has a peripheral lower edge which is configured as a sealing lip 22. In addition, the suction body,20 has a central breakthrough 24 which communicates with the vacuum connection 14. The breakthrough discharges into a vacuum chamber 26 which is surrounded by the sealing lip 22. The vacuum chamber 26 is further bounded by a contact surface 28 which comes down on a surface 30 of a work piece 32 when a work piece 32 is suctioned.

Figure 2:
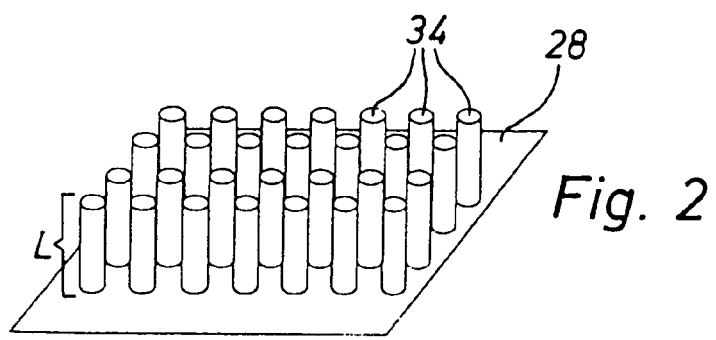
FIG. 2 shows a section of the microstructured surface at the contact surface of the vacuum gripper.

FIG. 2 shows a section of the contact area 26 on which a plurality of elements 34 are disposed vertically. These elements 34 project from the upper side of the contact area 28 in the manner of the bristles of a brush.

Figures 3A, 3B, 3C, 3D:
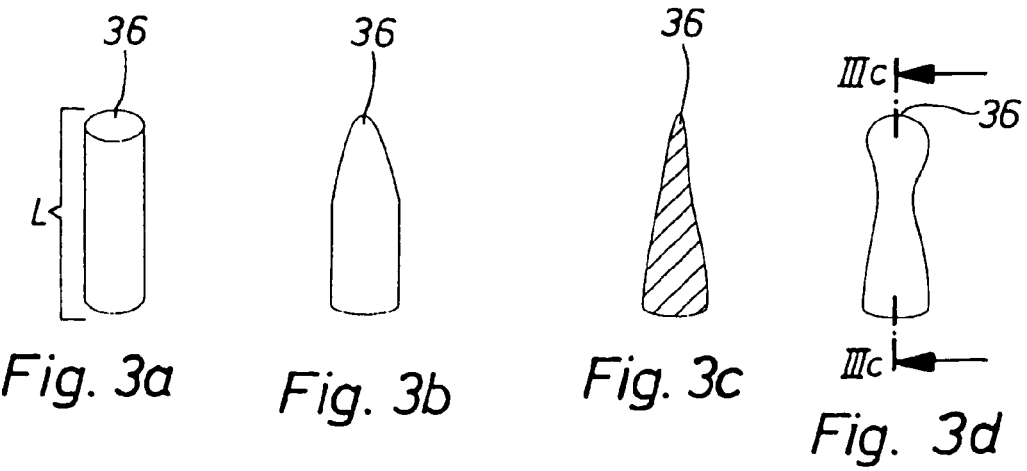
FIGS. 3a to 3d show embodiments of elements.

Preferably all the elements 34 are of equal length, where the length L measures 0.5 to 1 mm. FIGS. 3a to 3d show three embodiments of the elements 34, where in FIG. 3a the projection 34 has a circular cross-section and is furnished with a flattened free end 36. In FIG. 3b the free end 36 is pointed, where the projection 34 has an essentially parabolic form. FIG. 3c shows a longitudinal section through the embodiment of a projection 34 in accordance with FIG. 3d which is flattened, where the free end 36 comes to a point in the manner of a blade, but has a flat cross-section (leaf shape). This projection 34 has an asymmetrical cross-section and has a tendency to bend over in the direction of the flat sides. A projection of this type is preferably aligned on the contact surface 28 in such a way that the flat side of the free end 36 is aligned essentially parallel to the circumferential direction of the vacuum gripper 10.

Figures 4, 5:
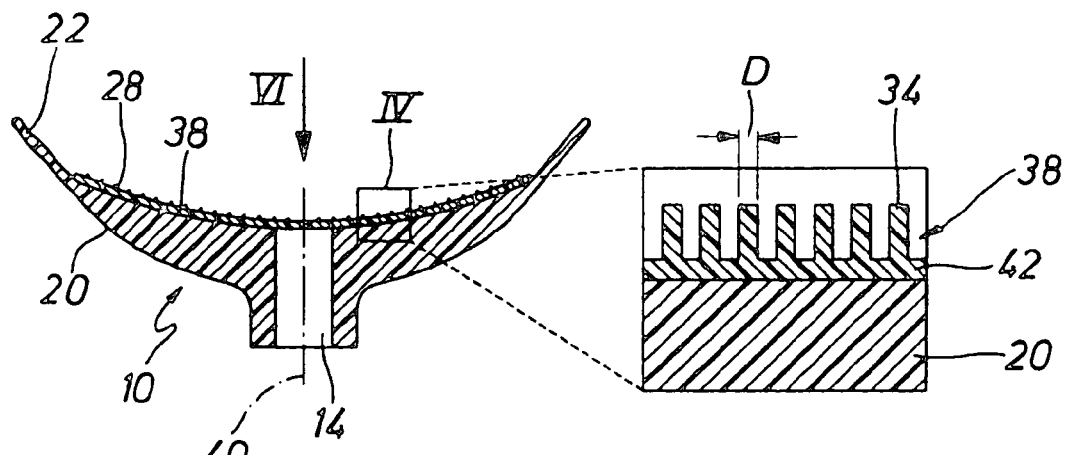
FIG. 4 shows a cross-section through a vacuum gripper from FIG. 1.
FIG. 5 shows an enlarged reproduction of a section IV in accordance with FIG. 4.

FIG. 4 shows the design of the contact surface 28, with a microstructure identified overall as 38 which extends from the center 40 of the vacuum gripper 10 over about 80% of the radius in the direction of the sealing lip 22.

FIG. 5 shows an enlarged reproduction of the section IV in accordance with FIG. 4 in which the microstructure 38, which is located on the suction body 20, is shown with its elements 34. The thickness D of the elements 34 measures about 10 to 50% of the length L of the elements. This means that the elements 34 are relatively slender and can bend without difficulty when the contact surface 28 is brought into the proximity of the work piece 32.

Figures 6, 7:
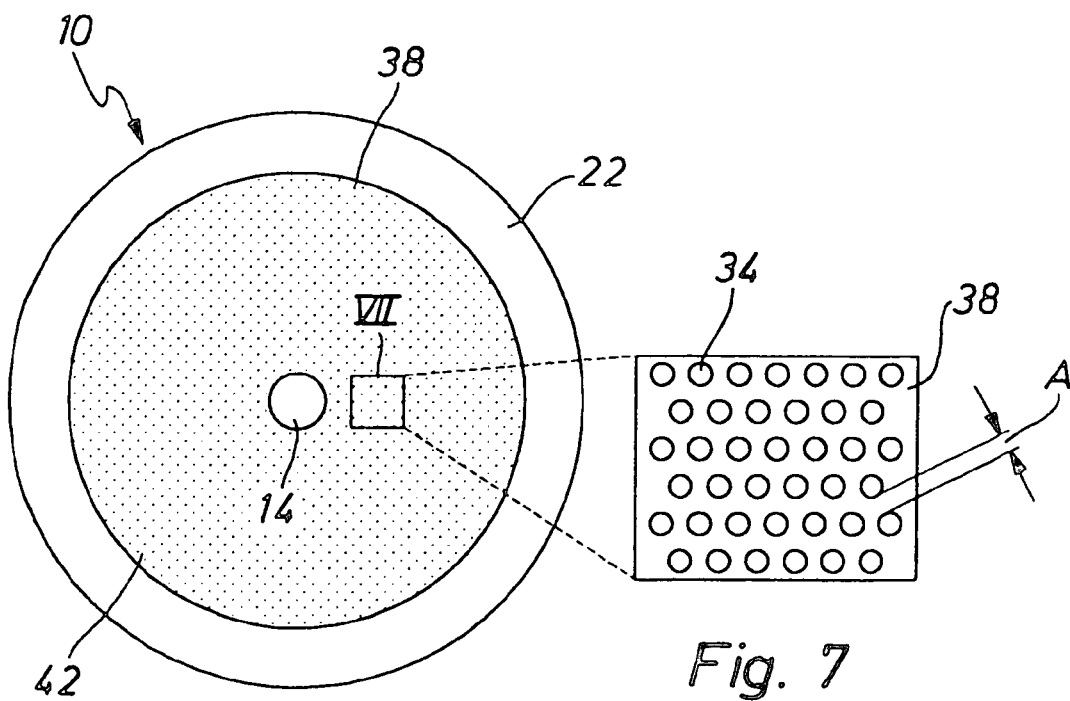
FIG. 6 shows a plan view onto the contact surface in the direction of the arrow VI in accordance with FIG. 4.
FIG. 7 shows an enlarged reproduction of a section VII in accordance with FIG. 6.

FIG. 6 shows a plan view onto the vacuum gripper 10 in the direction of the arrow VI in accordance with FIG. 4, where in section VII, which is shown in Figure VII, the individual elements are visible. The spacing of the individual elements 34 from each other is about 0.5 to 1.5 of the diameter D of the elements 34. The elements 34 can be disposed in regular lines and rows or staggered, as shown in FIG. 7.

The elements 34 can, as clearly shown in FIGS. 4 and 5, be furnished integrally on a film which is adhered to the suction body 20, with the additional potential for cutting the elements 34 out of the material of the suction body 20, for example using a laser.

The invention claimed is:

1. A vacuum gripper for suctioning work pieces comprising:
   a flexible suction body;
   a side of the suction body facing a workpiece including a sealing lip bounding a vacuum chamber, the vacuum chamber connected by air flow to a vacuum connection;
   the suction body having a contact surface abutting the work piece with prevailing vacuum in the vacuum chamber; and
   a microstructure projecting from the contact surface and formed of one of a rod, louver and pin-shaped elements having a length two to twenty times greater than a thickness of the elements, the elements having a free end intersected by a longitudinal axis of the elements, the free end being displaced away from the contact surface and the longitudinal axis oriented so as to intersect the contact surface.

2. The vacuum gripper in accordance with claim 1, wherein the elements are part of a microstructure.

3. The vacuum gripper in accordance with claim 1, wherein at least one of the elements and the free ends of the elements are pliably flexible.

4. The vacuum gripper in accordance with claim 1, wherein the elements are formed of the same material as the suction body.

5. The vacuum gripper in accordance with claim 1, wherein the elements are disposed as one piece on the suction body.

6. The vacuum gripper in accordance with claim 1, wherein the elements are disposed on a carrier to be attached to the suction body.

7. The vacuum gripper in accordance with claim 6, wherein the carrier is one of a plate and a film.

8. The vacuum gripper in accordance with claim 1, wherein the elements are made of plastic.

9. The vacuum gripper in accordance with claim 1, wherein the elements are at a distance from each other that corresponds to 0.5 to 2.5 times a thickness of the elements.

10. The vacuum gripper in accordance with claim 1, wherein the elements have one of a rounded, a flattened and a pointed free end.

11. The vacuum gripper in accordance with claim 1, wherein the elements have one of a circular, an elliptical and a flat cross section.

12. The vacuum gripper in accordance with claim 11, wherein a blade plane for elements with a flat cross section extends in the circumferential direction of the vacuum gripper.

13. The vacuum gripper in accordance with claim 1, wherein the elements project perpendicularly from the contact surface.

14. The vacuum gripper in accordance with claim 1, wherein the sealing lip is free of the elements.

15. The vacuum gripper in accordance with claim 1, wherein the elements extend over 70 to 95% of the vacuum gripper's radius, starting from the center of the vacuum gripper.

16. The vacuum gripper in accordance with claim 1, wherein a length of the elements measures 0.1 to 3 mm.

17. The vacuum gripper in accordance with claim 1, wherein a length of the elements is five to ten times greater than a thickness of the elements.

18. The vacuum gripper in accordance with claim 1, wherein the elements are at a distance from each other that corresponds to one to two times a thickness of the elements.

19. The vacuum gripper in accordance with claim 1, wherein a length of the elements measures 0.5 to1.0 mm.

20. A method for producing a suction gripper having a flexible suction body that includes a contact surface and a microstructure projecting from the contact surface, the microstructure formed of one of a rod, louver and pin-shaped elements, the method comprising the steps of:

injection molding the suction body; and cutting the elements at least partially out of the contact surface by means of a laser.

21. A method for producing a suction gripper having a flexible suction body that includes a contact surface and a microstructure projecting from the contact surface, the microstructure formed of one of a rod, louver and pin-shaped elements, the method comprising the steps of:

injection molding the suction body; and adhering, at least in sections, a film forming the elements to the contact surface.

22. The method in accordance with claim 21, comprising the step of adhering several films on top of each other.

* * * * *